(12) United States Patent
Vltavsky et al.

(10) Patent No.: US 10,812,485 B1
(45) Date of Patent: *Oct. 20, 2020

(54) WEARABLE DEVICE-BASED USER AUTHENTICATION

(71) Applicant: Wells Fargo Bank, N.A., San Francisco, CA (US)

(72) Inventors: Dominik Vltavsky, Belmont Street, CA (US); Miranda C. Hill, Seattle, WA (US); Gary Brewer, Taylorsville, UT (US); Markell J Dvorak, San Antonio, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,159

(22) Filed: Oct. 23, 2018

Related U.S. Application Data (63) Continuation of application No. 14/985,724, filed on Dec. 31, 2015, now Pat. No. 10,122,719.

(51) Int. Cl.
   *H04L 29/06* (2006.01)
(52) U.S. Cl.
   CPC ............ *H04L 63/10* (2013.01); *H04L 63/083* (2013.01)
(58) Field of Classification Search
   CPC .......... G06F 21/34; G06F 21/43; G06F 21/36; G06F 21/42; H04L 63/0853; H04L 63/18; H04L 2463/082
   See application file for complete search history.

(56) References Cited

U.S. PATENT DOCUMENTS

| | | | |
|---|---|---|---|
| 9,717,065 B2 * | 7/2017 | Varoglu | ................ H04W 64/00 |
| 9,736,147 B1 * | 8/2017 | Mead | .................... H04L 63/083 |
| 10,057,227 B1 * | 8/2018 | Hess | ....................... H04L 63/08 |
| 10,122,719 B1 | 11/2018 | Vltavsky et al. | |
| 2007/0033139 A1 | 2/2007 | Handler | |
| 2009/0077220 A1 * | 3/2009 | Svendsen | ............... G06Q 10/10 709/224 |
| 2009/0300738 A1 | 12/2009 | Dewe et al. | |
| 2011/0055084 A1 | 3/2011 | Singh | |
| 2011/0109431 A1 | 5/2011 | Bragagnini et al. | |
| 2011/0214158 A1 | 9/2011 | Pasquero et al. | |
| 2011/0302641 A1 | 12/2011 | Hald et al. | |

(Continued)

OTHER PUBLICATIONS

"U.S. Appl. No. 14/985,724, Final Office Action dated Jan. 24, 2018".

(Continued)

*Primary Examiner* — Lynn D Feild
*Assistant Examiner* — Abdullah Almamun
(74) *Attorney, Agent, or Firm* — Schwegman Lundberg & Woessner, P.A.

(57) ABSTRACT

Various systems and methods for authenticating a user are described herein. A system comprises a processor subsystem; and a memory including instructions, which when executed by the processor subsystem, cause the processor subsystem to: receive at a server from a first user device, a first authentication token; receive at the server from a second user device, a second authentication token; authenticate the user based on the first and second authentication tokens; and establish a communication session from the server to the first user device when the user is authenticated.

14 Claims, 5 Drawing Sheets

(56) References Cited

U.S. PATENT DOCUMENTS

| | | | |
|---|---|---|---|
| 2012/0066749 A1* | 3/2012 | Taugbol | G06F 21/40 726/6 |
| 2012/0276872 A1 | 11/2012 | Knauth et al. | |
| 2014/0149746 A1 | 5/2014 | Yau | |
| 2014/0282961 A1 | 9/2014 | Dorfman et al. | |
| 2014/0359138 A1 | 12/2014 | Charugundla | |
| 2015/0094026 A1 | 4/2015 | Martin | |
| 2015/0221057 A1 | 8/2015 | Raheja et al. | |
| 2015/0262441 A1 | 9/2015 | Kim et al. | |
| 2015/0347738 A1 | 12/2015 | Ulrich et al. | |
| 2016/0247156 A1* | 8/2016 | Hwang | G06Q 20/32 |
| 2016/0253651 A1 | 9/2016 | Park et al. | |
| 2016/0269403 A1 | 9/2016 | Koutenaei et al. | |
| 2016/0321437 A1* | 11/2016 | Kimmell | H04L 67/42 |
| 2017/0012959 A1* | 1/2017 | Sierra | H04L 63/083 |
| 2017/0061112 A1 | 3/2017 | Bandyopadhyay et al. | |
| 2017/0061405 A1 | 3/2017 | Bryant | |
| 2017/0126662 A1* | 5/2017 | Sreedhar | H04L 63/0815 |
| 2017/0148018 A1* | 5/2017 | Levin | G06Q 20/202 |

OTHER PUBLICATIONS

"U.S. Appl. No. 14/985,724, Non Final Office Action dated Jul 19, 2017", 16 pgs.

"U.S. Appl. No. 14/985,724, Notice of Allowance dated Jul. 5, 2018", 7 pgs.

"U.S. Appl. No. 14/985,724, Response filed May 24, 2018 to Final Office Action dated Jan. 24, 2018", 9 pgs.

"U.S. Appl. No. 14/985,724, Response filed Oct. 19, 2017 to Non Final Office Action dated Jul. 19, 2017", 10 pgs.

\* cited by examiner

WEARABLE DEVICE-BASED USER AUTHENTICATION

CROSS-REFERENCE TO RELATED APPLICATION

This application is a continuation of U.S. patent application Ser. No. 14/985,724, filed Dec. 31, 2015, which is incorporated by reference herein in its entirety.

TECHNICAL FIELD

Embodiments described herein generally relate to wearable devices and in particular, to wearable device-based user authentication.

BACKGROUND

User authentication is important to deter fraud and verify the identity of a user who wishes to access a secured resource. Examples of user authentication include the use of a username and password combination to access an online service.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Systems and methods described herein provide ways to use wearable devices in user authentication. Generally, methods of authenticating a person involve having the person present one or more factors to prove the person's identity. Authentication factors may include one or more of the following: (1) Something a person knows (e.g., a password or personal identification number (PIN)); (2) Something a person has (e.g., a proximity card, smart card, or a password-generating token); or (3) Something a person is (e.g., an inherent property of the person, such as a biometric like a fingerprint or an iris scan). The factors may be generally described as knowledge factors, possession factors, and inherent factors. Single-factor authentication involves the use of one of these factors to verify a person's identity. Two-factor authentication involves the use of two of these factors to verify a person's identity. Multi-factor authentication involves the use of two or more of these factors, or two or more instances of a factor, to verify a person's identity. The strength of security in an authentication system increases with the number of factors used to prove a person's identity. Conventionally, when two or more factors are used, the mechanism is considered a "strong" authentication scheme.

With the introduction of personal devices with wireless networking capabilities, the concepts of a personal area network (PAN) and a body area network (BAN) have evolved. A PAN includes devices such as computers, telephones, and personal digital assistants in a person's workspace. A BAN includes devices that are worn, on, or embedded into a person's body, such as e-textiles, smartwatches, or heart monitors. For the purposes of the discussion, a combination network named a personal device collection (PDC) includes devices that associated with a person, including devices that a person may be wearing or carrying, and may include devices from a person's PAN or BAN. In a PDC, there is no requirement that any of the devices be communicatively connected to one another. Thus, a PDC may include two distinctly addressed BANs, a PAN and a BAN that do not interoperate, or the like. Using multiple devices in a PDC, the person may improve the authentication strength and ultimately improve the security mechanisms when accessing sensitive information.

Figure 1:
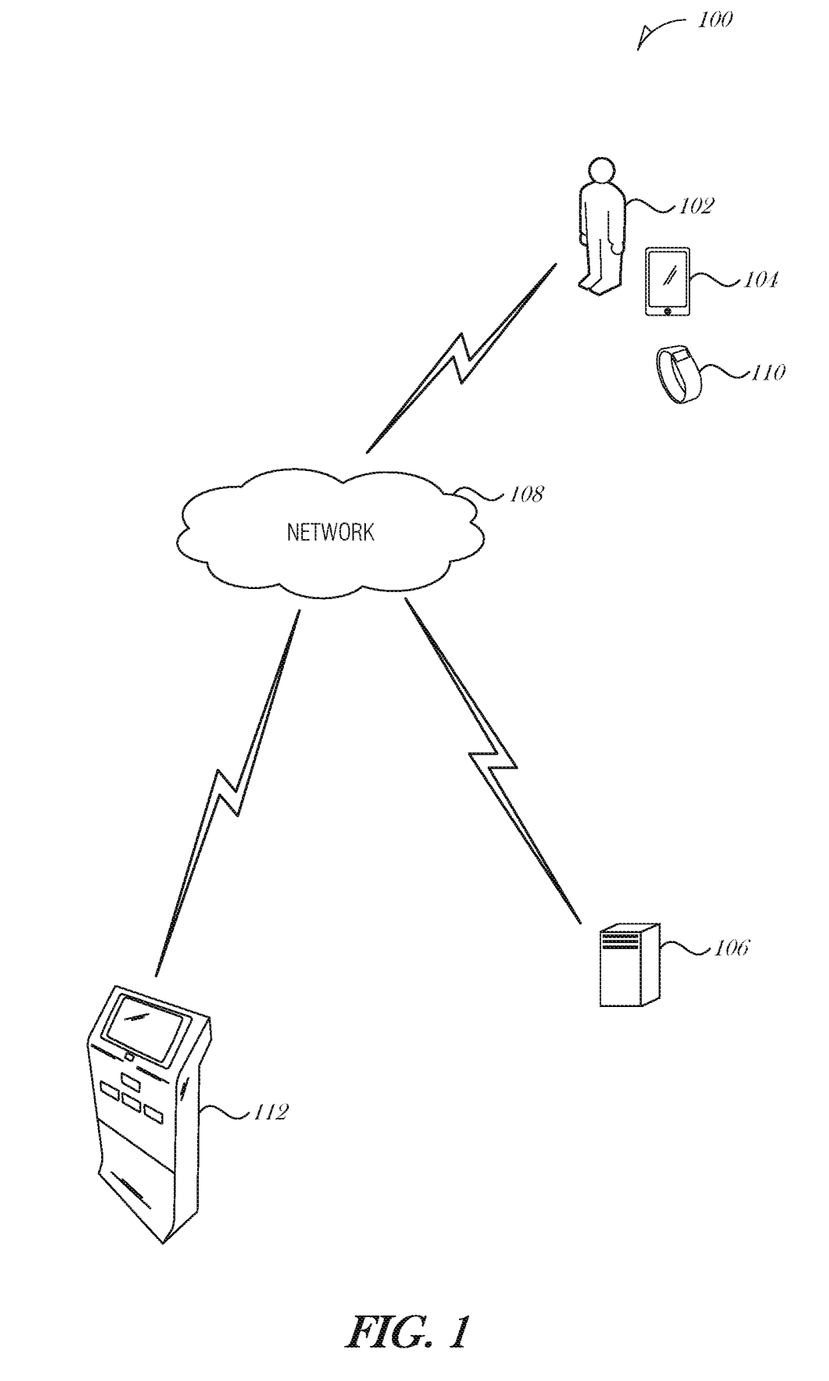
FIG. 1 is a diagram illustrating an operating environment, according to an embodiment.

FIG. 1 is a diagram illustrating an operating environment 100, according to an embodiment. A user 102 may use a smartphone 104 to access an online service 106. The online service 106 may provide any type of service involving sensitive information, such as a banking service, an investment service, a tax service, an estate planning service, a human resources service, a social media platform, an online store, or the like. To connect to the online service 106, the user 102 may execute an application ("app") to connect to the online service 106 via a network 108. The user 102 may enter a username and password to access the online service 106. The username and password constitutes a first factor of authentication. In addition to the first factor, the user 102 may provide additional factors.

The user 102 may have one or more additional devices in the user's PDC, such as a wearable device like a smartwatch, smartglasses, or a smartring. The user 102 may provide one or more additional factors using a second device from the PDC, where the first device is considered the smartphone 104. In the example illustrated, the second device from the PDC is a smartwatch 110. For example, the user 102 may unlock, pair, access, or authenticate to the smartwatch 110, thereby providing additional authentication factors. The use of the smartphone 104, which may be registered with the online service 106, the username and password, the smartwatch 110, and an authentication from the smartwatch 110, may constitute a total of four factors (two possession factors and two knowledge factors).

In addition to, or alternatively, the user 102 may access a secured resource using the security mechanisms described. The secured resource may be any service, object, secured area, or the like, including, but not limited to, a server room, a bank vault, a research facility, an automated teller machine (ATM), a vehicle, etc. Thus, in the example illustrated in FIG. 1, the user 102 may access an ATM 112 using a multi-factor authentication scheme.

To authenticate or access the second device of the PDC (e.g., the smartwatch 110), the user 102 may perform any of a wide range of activities including, but not limited to, providing a biometric, providing a personal identification number (PIN), tracing a predefined shape on a touchscreen display, providing a voice sample, or the like. Once authenticated or unlocked, the smartwatch 110 may communicate with the smartphone 104 and provide one or more tokens indicating that the smartwatch 110 has been authenticated.

As an example, the user 102 may have a smartwatch 110 in addition to the smartphone 104 in his PDC. The user 102 may unlock the smartphone 104 and access an application on the smartphone 104 to open a session with the online service 106. The user may supply a username and password combination to the application. The application may prompt the user for the additional authentication tokens. The user 102 may unlock the smartwatch 110 using a doodle pattern which was previously set. The doodle pattern may be a relatively unique pattern that the user set with one or more finger traces on the smartwatch's touchscreen display. After successfully unlocking the smartwatch 110, the smartwatch may communicate with the smartphone 104 and provide tokens indicating the identity of the smartwatch 110 and the fact that the smartwatch 110 was successfully unlocked with the doodle pattern. The smartphone 104 may then provide the tokens to the online service 106 to complete the authentication process. The smartwatch 110 and the smartphone 104 may be logically connected in some fashion, such as with Bluetooth pairing. The logical connection may be used to infer a chain of trust among devices in the PDC, which may be communicated to the online service 106 as an additional authentication token.

As another example, the user 102 may have smartglasses on his person and in response to the application on the smartphone 104 querying for additional authentication tokens, the smartglasses may scan the user's eyes to obtain a retinal or iris scan, confirm that the user is known to the smartglasses and pass tokens to the smartphone 104 when the user 102 is confirmed.

As yet another example, the user 102 may have both a smartwatch and smartglasses, and both processes described above are used to provide four tokens to the application on the smartphone 104. Only when the four tokens from the PDC are provided with the tokens from the smartphone 104 will the application unlock and allow access to the user 102. Similar access protocols may be used to unlock secured resources.

As yet another example, the user 102 may use an application on the smartphone 104 to initiate a communication session with a customer service representative (CSR). After logging into the application, the user 102 may initiate a text chat, a phone call, an email, etc., to contact a CSR. In the case of a phone call, the user 102 may be connected to an interactive voice response (IVR) system to handle the user's incoming call. The IVR system may use information passed from the smartphone 104 to route the user's call to an appropriate CSR. In addition, the IVR system may use authentication tokens passed from the smartphone 104 to indicate to the CSR that the user is authentic. When additional authentication tokens are obtained at the user's location, such as authentication tokens from the user's smartwatch 110, the additional tokens may be passed to the IVR system via the smartphone 104. Alternatively, the additional tokens may be passed to the IVR system over a different channel (e.g., directly from the smartwatch 110 to the online service 106 using a separate communication channel). The IVR system may correlate the user's contact with the IVR via the smartphone 104 and the incoming tokens via a separate channel, analyze the timing of the incoming tokens from the smartphone 104 and tokens from the smartwatch 110, and authenticate the user based on the tokens being correct and arriving in close proximity to one another (e.g., within a second of each other).

Figure 2:
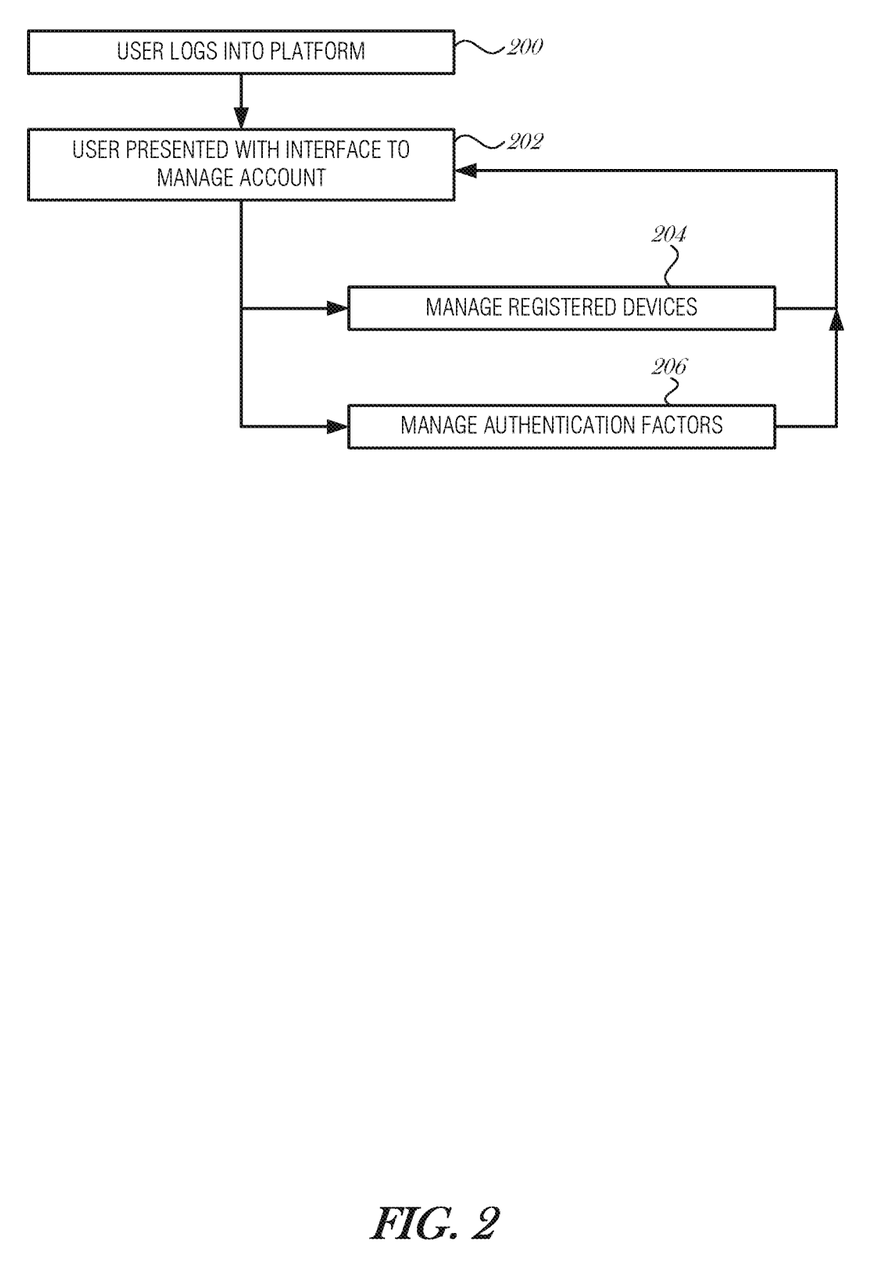
FIG. 2 is a flow diagram illustrating the control and data flow for using multiple devices in an authentication scheme, according to an embodiment.

FIG. 2 is a flow diagram illustrating the control and data flow for using multiple devices in an authentication scheme, according to an embodiment. At operation 200, a user logs on to a platform. Access to the platform may be by way of a webpage, a mobile app, a desktop application, a kiosk, or the like. Prior to logging in, the user may have set up an account on the platform, during which the user may have provided initial authentication factors, such as a username and password, the identification of a trusted device, a secret question, and the like. The trusted device may be registered with the platform by uniquely identifying the trusted device, such as by using a globally unique identifier (GUID) associated with the device. Various identifiers may be used, including an arbitrarily generated GUID, a universally unique identifier (UUID), a unique device identifier (UDID), a serial number, a phone number, an advertising identifier, or combinations of identifiers associated with a trusted device. The identifier (or identifiers) may be stored in a database at the platform and associated with the user's account. In this manner, when the user attempts to connect to the platform, one of the checks may be to confirm that the user is attempting to connect from a registered device.

When the user wants to add additional authentication factors or change existing authentication factors (e.g., when upgrading to a new smartphone), the user may access the platform and perform various functions. After authentication (e.g., with a username and password), the user may be presented with an interface to perform various functions (operation 202). In the example illustrated in FIG. 2, the user may choose to manage registered devices (operation 204) or manage authentication factors (operation 206).

When the user chooses the manager registered devices (operation 204), the user may be presented with a user interface listing existing registered devices. With user interface controls, the user may add, delete, or modify registered devices. Information regarding a registered device may be stored as a record in a database at the platform and include a unique identifier, a description, and additional information depending on the design of the database. For example, an access history may be maintained to store the times and dates of access by each registered device. As such, to register a device a user may be prompted to enter a name or description of the device and an identifier. The identifier may be a value that is passed to the platform when initiating a communication session and may be obtained from the device via an application programming interface (API) on the device. The identifier may be a GUID of the types described above. The user may be provided with a confirmation challenge-response to confirm the new device. For example, after entering information for a new device, the new device may be required to connect to the platform and provide a one-time password that was generated by the platform.

To continue with the example from above, the user 102 may have the smartphone 104 registered with the online service 106. The user 102 may decide to increase authentication strength by adding the smartwatch 110 as an additional authentication factor. The user 102 may access the online service 106 via an app on the smartphone 104 and work through interface screens to add a new device. The user 102 may be provided a one-time password via the interface in the app, which is to be entered on the smartwatch 110 and transmitted to the online service 106. After the one-time password is received and verified, the smartwatch 110 may be considered a secondary registered device. After registered the smartwatch 110, the user 102 may be required to have the smartwatch 110 in possession and optionally unlocked, in order to access the online service 106 via the smartphone 104. This may be enforced by the online service 106 by requesting tokens from the smartphone 104 and the smartwatch 110 while setting up the communication session.

In some cases, the platform may require at least two registered devices. These devices may be registered before the first log on. For example, the user may set up the account in-person at a branch office, provide the device details to an account manager, and have the account manager initially register the devices. Afterwards, the user may add more devices and delete registered devices, so long as there are at least two devices registered. To do so, the user may access the account using the (at least two) registered devices and then modify the registered device settings. The platform may enforce the two registered device minimum by not allowing the user to delete registered devices if the result would be that fewer than two registered devices remain.

In addition to managing registered devices, the user may manage authentication factors (operation 206). Some authentication factors are inherent by virtue of the registered devices. That is, by using registered devices, the user is providing possession-based authentication factors. The user may manage additional knowledge or inherent authentication factors in operation 206. Examples of knowledge factors include, but are not limited to usernames, passwords, personal identification numbers (PINs), unlock gestures, unlock patterns, unlock drawings, and the like. Examples of inherent factors include, but are not limited to fingerprints, eye scans, voice samples, facial analysis, hand geometry, retina analysis, iris analysis, signature analysis, and other biometric data.

The user may add, remove, or modify authentication factors. To add a new authentication factor, the user may create a new entry, provide a description, and then provide one or more samples to create the authentication factor. An authentication factor may be tied to a particular input device. For example, a PIN may be associated with a smartphone and a voice sample may be associated with a smartwatch. As such, to access secured systems the user is required to provide the PIN using an interface on the smartphone and the voice sample using a microphone and interface on the smartwatch. The smartphone and smartwatch may separately and independently communicate their authentication factors (possession and inherent) to the secured platform for authorization. Alternatively, either the smartphone or smartwatch may act as a communication conduit for the other, passing the authentication factors from one to the platform along with its own factors.

Figure 3:
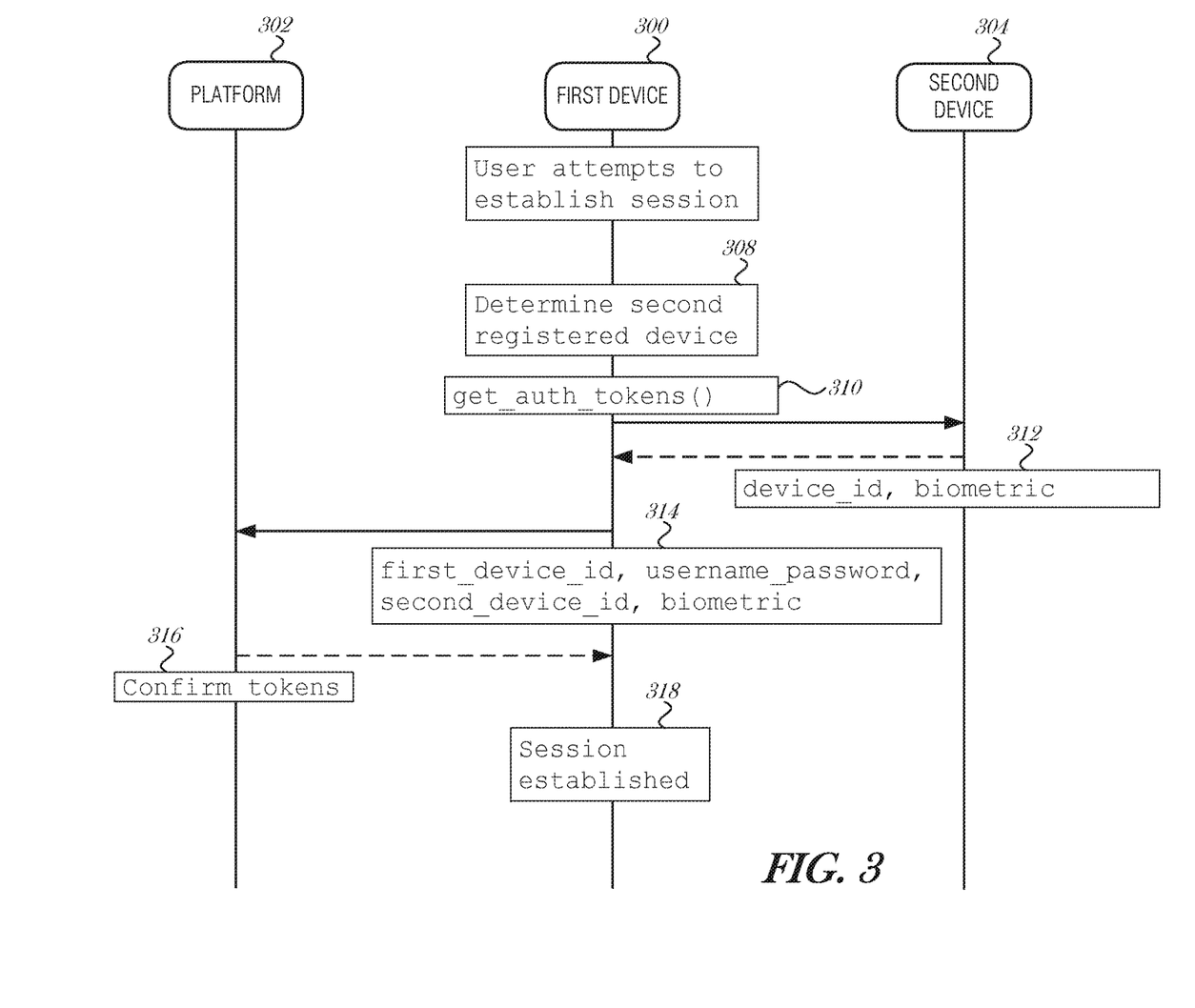
FIG. 3 is a swim lane diagram illustrating the interaction between multiple devices from a personal device collection (PDF) with a platform to access a secured resource, according to an embodiment.

FIG. 3 is a swim lane diagram illustrating the interaction between multiple devices from a PDC with a platform to access a secured resource, according to an embodiment. A user interacts with a first device 300 and open an application. The application may provide the user access to an online secured resource, such as an online financial account. To access the secured resource, the user authenticates with the first device 300 providing a username and password (operation 306). The application may then reference an internal data store to determine whether there are any other registered devices used to authenticate. If there is only one registered device (e.g., the first device 300), then the first device 300 may open a communication session with the platform 302 and pass the authentication tokens indicating the first device's identity and the username and password combination.

A registered second device 304 may be paired with the first device 300, such as with Bluetooth pairing. However, if the second device 304 is not within communication range, then the first device 300 and the second device 304 may not be actively connected. By using a short-range wireless communication standard, such as Bluetooth, NFC, or the like, a user having both the first and second devices 300, 304 in their possession provides a higher degree of confidence that the user is authentic.

When the first device 300 determines that another registered device exists (operation 308), the first device 300 attempts to communicate with the second device 304 to obtain authentication tokens (operation 310). In response to the request, the second device 304 collects and returns authentication tokens. The authentication tokens to be collected may be pre-configured, for example using the process described in FIG. 2. The second device 304 may prompt a user for biometric authentication input, knowledge-based authentication input, or other types of authentication input. After collecting the authentication inputs, the second device 304 transmits authentication tokens representing the input to the first device 300 (operation 312).

Authentication tokens may be used to represent a successful challenge and response. The device may challenge a user with a prompt or query, and the response may be checked at the device. Alternatively, the response may be transmitted to a trusted resource to check the validity of the response. For example, the second device 304 may prompt the user to speak a phrase, capture the spoken phrase as a recording, transmit the recording to a cloud service to analyze it against an exemplar sample, and if the recording is confirmed to be authentic, then create a token and pass the token to the first device 300.

After the first device 300 receives a response from the second device 304, the first device 300 transmits tokens for the first device 300 (e.g., a possession-based token and a username/password token) and the second device 304 (e.g., a possession-based token and a biometric token) to the platform 302 (operation 314).

The platform 302 may confirm the validity of the tokens and then send an acknowledgement to the first device 300 (operation 316). The platform 302 may use the tokens to validate the identity of the user for other processes and services provided by the platform 302. The session is established (operation 318) once the platform 302 confirms the validity of the authentication tokens.

As an illustrative example, a user may access an online banking service with an application on a smartphone (e.g., first device 300). The smartphone may be paired with a smartwatch (e.g., second device 304). The user may open the application and be presented with a login screen. The user may provide a username and password combination to unlock and access the application. As part of the authentication process, the application may check the user's profile to identify other registered devices. The application may then attempt to communicate with the other devices. The user may receive a prompt on her smartwatch indicating that the application is attempting to authenticate her identity. In response, the user may unlock the smartwatch and interact, providing a fingerprint sample. The smartwatch may compare the user's fingerprint sample with a known exemplar fingerprint. After confirming that the fingerprint provided by user matches the previously-obtained fingerprint, the smartwatch may communicate tokens to the smartphone. The smartphone in turn communicates its own tokens and the tokens of the smartwatch to the online banking system. Later, when the user interacts with the application, the client-side application and the server-side platform know that the user is authenticated. The user may further cause the application to make a phone call using a cellular connection. For example, the user may want to contact a customer service representative. The application may initiate the phone call and pass the tokens to the platform (or just reference them), so that the customer service representative is assured that the person calling is the authenticated user.

Figure 4:
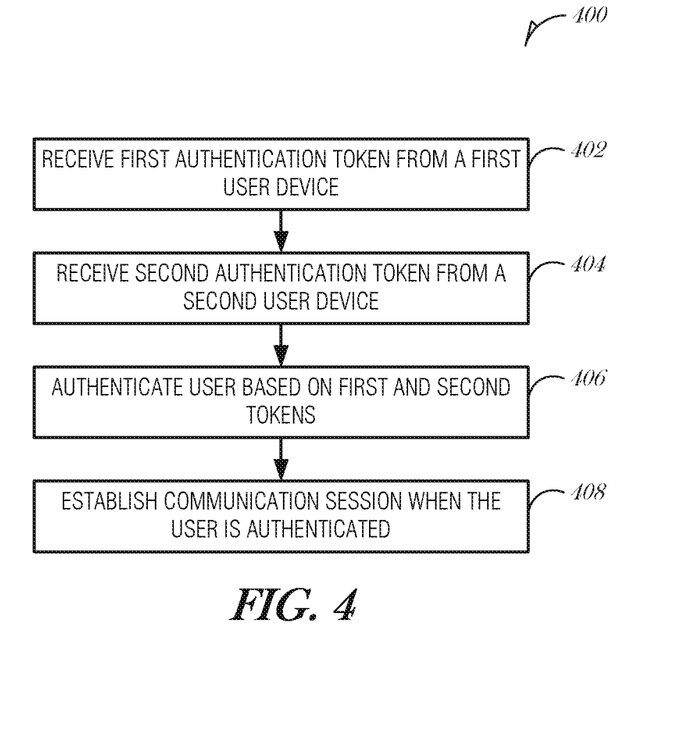
FIG. 4 is a flowchart illustrating a method of authenticating a user, according to an embodiment.

FIG. 4 is a flowchart illustrating a method 400 of authenticating a user, according to an embodiment. At block 402, a first authentication token is received at a server from a first user device. At block 404, a second authentication token is received at the server from a second user device. The first and second user devices may be any type of devices including, but not limited to a desktop computer, a laptop computer, a hybrid computer, a wearable device, a smartwatch, a smartglasses, a smartphone, or the like.

At block 406, the user is authenticated based on the first and second authentication tokens.

At block 408, a communication session is established from the server to the first user device when the user is authenticated.

In an embodiment, the first authentication token comprises a possession-factor token indicating that the user is in possession of the first user device. Possession-factor tokens are tokens that indicate that the user provided a possession-based authentication factor. Possession-based authentication factors include a device identifier, a serial number, a phone number, or other indicia that the user is in possession of a trusted item.

In an embodiment, the first authentication token comprises a knowledge-factor token indicating that the user provided a correct knowledge-based authentication factor to the first user device. Knowledge-factor tokens are tokens that indicate that the user provided the correct knowledge-based response to a query. Knowledge-based authentication factors include pass phrases, PINs, username/password combinations, a unique pattern (e.g., drawing a pattern on a touchscreen), an answer to a secret question, or the like.

In an embodiment, the first authentication token comprises an inherent-factor token indicating that the user provided a correct inherent-based authentication factor to the first user device. Inherent-factor tokens are tokens that indicate that the user provided a biometric that matched an exemplar biometric. Inherent-based authentication factors include eye scans, voice scans, fingerprints, and the like.

In an embodiment, the second authentication token comprises a possession-factor token indicating that the user is in possession of the second user device. In an embodiment, the second authentication token comprises a knowledge-factor token indicating that the user provided a correct knowledge-based authentication factor to the second user device. In an embodiment, the second authentication token comprises an inherent-factor token indicating that the user provided a correct inherent-based authentication factor to the first second device.

In an embodiment, the first and second user devices are paired. The first and second devices may be paired using a Bluetooth standard.

In an embodiment, receiving the second authentication token comprises receiving the second authentication token via the first user device. The first user device may act as a conduit for information. For example, the second user device may lack long-range communication capabilities and using short-range communication (e.g., Bluetooth), the second user device is able to communicate tokens to the first user device, which then relays the tokens to the server.

In an embodiment, the communication session comprises a phone call between the user and a customer service representative. For example, the user may want to initiate a call with a customer service representative and the user authentication scheme is used to verify the user's identity before allowing the user to converse with a representative.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
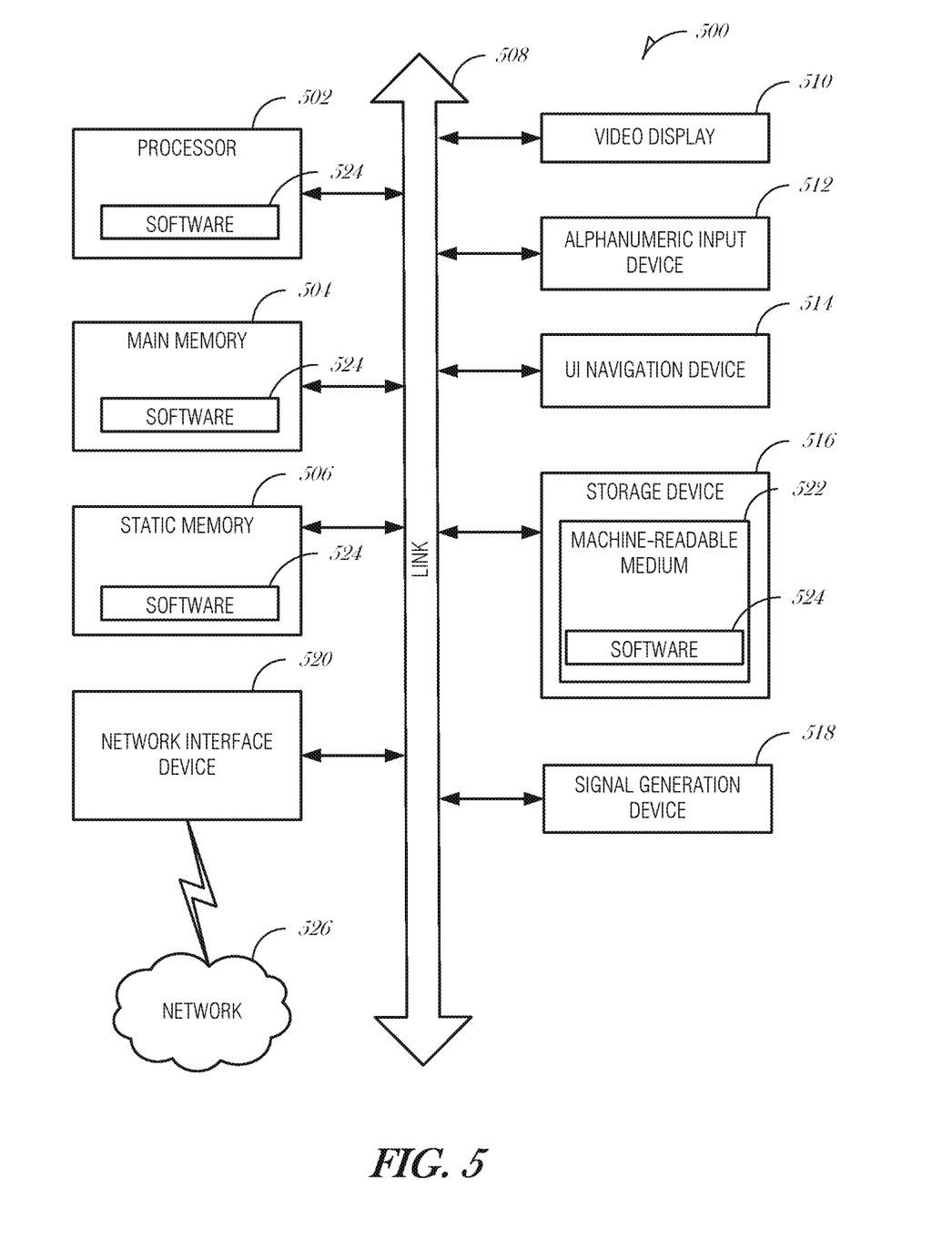
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:
   a processor subsystem; and
   a memory including instructions, which when executed by the processor subsystem, cause the processor subsystem to:
   receive at a server from a first user device, a first authentication token;
   receive at the server from a second user device, a second authentication token, the second authentication token being different than the first authentication token, wherein the first user device and the second user device are registered to the user as part of a user account, the user account configured to prevent deletion of a registered device of a user account if deleting the registered devices decreases a total number of registered devices below a minimum threshold;
   authenticate, at the server, the user based on the first and second authentication tokens; and
   establish a communication session from the server to the first user device when the user is authenticated based on the received first and second authentication tokens.

2. The system of claim 1, wherein the instructions, which when executed by the processor subsystem, further cause the processor subsystem to:
   receive at the server from the first user device, a username and password; and
   wherein the user is authenticated based on the username and password with the first and second authentication tokens.

3. The system of claim 1, wherein an amount of time between receipt of the first and second authentication tokens is used to authenticate the user.

4. The system of claim 1, wherein the instructions, which when executed by the processor subsystem, further cause the processor subsystem to:
   receive a third authentication token, the third authentication token associated with a third user device; and
   authenticate, at the server, the user based on the first, second, and third authentication tokens.

5. The system of claim 1, wherein the first authentication token comprises a knowledge-factor token indicating that the user provided a correct knowledge-based authentication factor to the first user device and wherein the knowledge-based authentication factor is registered to the first user device in the user account.

6. A method comprising:
   receiving at a server from a first user device, a first authentication token;
   receiving at the server from a second user device, a second authentication token, the second authentication token being different than the first authentication token, wherein the first and second user device are registered to the user as part of a user account the user account configured to prevent deletion of a registered device of a user account if deleting the registered devices decreases a total number of registered devices below a minimum threshold;
   authenticating, at the server, the user based on the first and second authentication tokens; and
   establishing a communication session from the server to the first user device when the user is authenticated based on the received first and second authentication tokens.

7. The method of claim 6, further comprising
   receiving at the server from the first user device, a username and password; and
   wherein the user is authenticated based on the username and password with the first and second authentication tokens.

8. The method of claim 6, wherein an amount of time between receipt of the first and second authentication tokens is used to authenticate the user.

9. The method of claim 6, further comprising
   receiving a third authentication token, the third authentication token associated with a third user device; and
   authenticating, at the server, the user based on the first, second, and third authentication tokens.

10. The method of claim 6, wherein the first authentication token comprises a knowledge-factor token indicating that the user provided a correct knowledge-based authentication factor to the first user device and wherein the knowledge-based authentication factor is registered to the first user device in the user account.

11. A non-transitory computer readable medium comprising instructions, which when executed by at least one processor, configure the at least one processor to perform operations comprising:
    receiving at a server from a first user device, a first authentication token;
    receiving at the server from a second user device, a second authentication token, the second authentication token being different than the first authentication token, wherein the first and second user device are registered to the user as part of a user account, the user account configured to prevent deletion of a registered device of a user account if deleting the registered devices decreases a total number of registered devices below a minimum threshold;
    authenticating, at the server, the user based on the first and second authentication tokens; and
    establishing a communication session from the server to the first user device when the user is authenticated based on the received first and second authentication tokens.

12. The non-transitory computer readable medium of claim 11, the operations further comprising:
    receiving at the server from the first user device, a username and password; and
    wherein the user is authenticated based on the username and password with the first and second authentication tokens.

13. The non-transitory computer readable medium of claim 11, wherein an amount of time between receipt of the first and second authentication tokens is used to authenticate the user.

14. The non-transitory computer readable medium of claim 11, the operations further comprising:
   receiving a third authentication token, the third authentication token associated with a third user device; and
   authenticating, at the server, the user based on the first, second, and third authentication tokens.

* * * * *

UNITED STATES PATENT AND TRADEMARK OFFICE
CERTIFICATE OF CORRECTION

PATENT NO. : 10,812,485 B1
APPLICATION NO. : 16/168159
DATED : October 20, 2020
INVENTOR(S) : Vitavsky et al.

It is certified that error appears in the above-identified patent and that said Letters Patent is hereby corrected as shown below:

In the Claims

In Column 12, Line 8, in Claim 6, after "a user account", insert --,--

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*